United States Patent
Kitao et al.

(10) Patent No.: US 11,909,149 B2
(45) Date of Patent: Feb. 20, 2024

(54) ROTARY CONNECTOR DEVICE AND ROTATION BODY OF ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Satoshi Kitao, Inukami-gun (JP); Shingo Nambu, Inukami-gun (JP); Kenji Yoshimura, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 618 days.

(21) Appl. No.: 17/096,956

(22) Filed: Nov. 13, 2020

(65) Prior Publication Data

US 2021/0066872 A1 Mar. 4, 2021

Related U.S. Application Data

(63) Continuation of application No. PCT/JP2019/020511, filed on May 23, 2019.

(30) Foreign Application Priority Data

May 28, 2018 (JP) ................................. 2018-101689

(51) Int. Cl.
*H01R 35/04* (2006.01)
*H02G 11/02* (2006.01)

(52) U.S. Cl.
CPC ............. *H01R 35/04* (2013.01); *H02G 11/02* (2013.01)

(58) Field of Classification Search
CPC ...... H01R 35/00; H01R 35/04; H01R 35/025; H02G 11/02; B60R 16/027
See application file for complete search history.

(56) References Cited

U.S. PATENT DOCUMENTS 6,099,331 A * 8/2000 Kikkawa ............... B60R 16/027
439/15
6,659,788 B2 * 12/2003 Canuto ................. B60R 16/027
439/248

(Continued)

FOREIGN PATENT DOCUMENTS

| CN | 103515820 | 1/2014 |
| CN | 204947295 U | 1/2016 |

(Continued)

OTHER PUBLICATIONS

Chinese Office Action for corresponding CN Application No. 201980029040.X, dated Jun. 30, 2021 (w/ English machine translation).

(Continued)

*Primary Examiner* — Thanh Tam T Le
(74) *Attorney, Agent, or Firm* — Mori & Ward, LLP

(57) ABSTRACT

A rotary connector device includes a fixed body, a rotation body, and a connector. The rotation body is rotatable about a rotation axis with respect to the fixed body. The connector includes a cover, a conductor, and a holding member. The cover includes a first wall and a space therein. The first wall extends from the rotation body in an axial direction substantially parallel to the rotation axis. The holding member is attached to the cover in the space and holds the conductor. The holding member includes, in the first wall, an exposed portion exposed to an outside of the space. The cover and the holding member include a restriction structure to restrict foreign matter from entering the space through the exposed portion. The restriction structure includes a first protrusion (Continued)

that protrudes in a direction substantially orthogonal to the first wall and a first recess in which the first protrusion is fitted.

7 Claims, 9 Drawing Sheets

(56) References Cited

U.S. PATENT DOCUMENTS

| | | | | |
|---|---|---|---|---|
| 7,774,945 | B2* | 8/2010 | Sano | G01D 11/245 |
| | | | | 73/117.02 |
| 7,798,816 | B2* | 9/2010 | Oishi | B62D 1/16 |
| | | | | 439/15 |
| 8,758,024 | B2* | 6/2014 | Adachi | B60R 16/0207 |
| | | | | 439/15 |
| 8,834,179 | B2* | 9/2014 | Park | B60R 16/027 |
| | | | | 439/15 |
| 9,011,162 | B2* | 4/2015 | Sato | B60R 16/037 |
| | | | | 439/15 |
| 9,472,914 | B2* | 10/2016 | Takahashi | H01R 35/025 |
| 10,468,845 | B2* | 11/2019 | Asakura | H01R 35/025 |
| 10,554,003 | B2* | 2/2020 | Saito | B60R 16/027 |
| 10,647,275 | B2* | 5/2020 | Ushiyama | H01R 13/5216 |
| 10,686,286 | B2* | 6/2020 | Ushiyama | B60R 16/027 |
| 10,826,249 | B2* | 11/2020 | Utsunomiya | H02H 9/026 |
| 2013/0344706 | A1 | 12/2013 | Sato et al. | |
| 2016/0006203 | A1 | 1/2016 | Takahashi et al. | |
| 2019/0089109 | A1 | 3/2019 | Hirai et al. | |
| 2019/0118738 | A1 | 4/2019 | Ushiyama | |
| 2019/0207352 | A1 | 7/2019 | Ushiyama | |

FOREIGN PATENT DOCUMENTS

| | | |
|---|---|---|
| CN | 105322399 | 2/2016 |
| JP | 2004-222369 | 8/2004 |
| WO | WO 2017/170650 | 10/2017 |
| WO | WO 2017/170752 | 10/2017 |
| WO | WO 2018/047581 | 3/2018 |

OTHER PUBLICATIONS

Chinese Office Action for corresponding CN Application No. 201980029040.X, dated Mar. 16, 2022 (w/ English machine translation).
International Search Report for corresponding International Application No. PCT/JP2019/020511, dated Aug. 27, 2019.
Written Opinion for corresponding International Application No. PCT/JP2019/020511, dated Dec. 10, 2020.
Extended European Search Report for corresponding EP Application No. 19811923.2-1201, dated May 4, 2021.
Japanese Office Action for corresponding JP Application No. 2020-522144 dated Mar. 14, 2023 (w/ English machine translation).
Japanese Office Action for corresponding JP Application No. 2020-522144 dated Aug. 29, 2023 (w/ English machine translation).
Korean Office Action for corresponding KR Application No. 10-2020-7035770 dated Nov. 9, 2023 (w/ English machine translation).

* cited by examiner

ROTARY CONNECTOR DEVICE AND ROTATION BODY OF ROTARY CONNECTOR DEVICE

CROSS-REFERENCE TO RELATED APPLICATIONS

The present application is a continuation application of International Application No. PCT/JP2019/020511, filed May 23, 2019, which claims priority to Japanese Patent Application No. 2018-101689 filed May 28, 2018. The contents of these applications are incorporated herein by reference in their entirety.

BACKGROUND OF THE INVENTION

Technical Field

The technology disclosed in the present application relates to a rotary connector device and a rotation body of the rotary connector device.

Background Art

There is known a rotary connector device including a fixed body and a rotation body that includes a connector portion and is assembled to the fixed body so as to be rotatable with respect to the fixed body (e.g., see Japanese Unexamined Patent Application Publication No. 2004-222369A).

SUMMARY

According to one aspect of the present application, a rotary connector device includes a fixed body, a rotation body, and a connector. The rotation body is assembled to the fixed body. The rotation body is rotatable about a rotation axis with respect to the fixed body. The connector is connected to the rotation body. The connector includes a cover, a conductor, and a holding member. The cover includes a first wall and a space therein. The first wall extends from the rotation body in an axial direction substantially parallel to the rotation axis. The conductor is electrically connected to a cable conducting wire and is disposed in the space. The holding member is attached to the cover in the space and holds the conductor. The holding member includes, in the first wall, an exposed portion exposed to an outside of the space. The cover and the holding member include a restriction structure to restrict foreign matter from entering the space through the exposed portion. The restriction structure includes a first protrusion that protrudes in a direction substantially orthogonal to the first wall and a first recess in which the first protrusion is fitted.

According to another aspect of the present application, a rotation body of a rotary connector device includes an annular member and a connector. The annular member is to be assembled to a fixed body. The annular member is rotatable about a rotation axis with respect to the fixed body. The connector is connected to the annular member. The connector includes a cover, a conductor, and a holding member. The cover includes a first wall and a space therein. The first wall extends from the annular member in an axial direction substantially parallel to the rotation axis. The conductor is electrically connected to a cable conducting wire and is disposed in the space. The holding member is attached to the cover in the space and holds the conductor. The holding member including, in the first wall, an exposed portion exposed to an outside of the space. The cover and the holding member include a restriction structure to restrict foreign matter from entering the space through the exposed portion. The restriction structure includes a first protrusion that protrudes in a direction substantially orthogonal to the first wall and a first recess in which the first protrusion is fitted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Hereinafter, embodiments will be described with reference to the drawings. In the figures, the same reference signs denote corresponding or identical components.

Configuration of Rotary Connector Device

Figure 1:
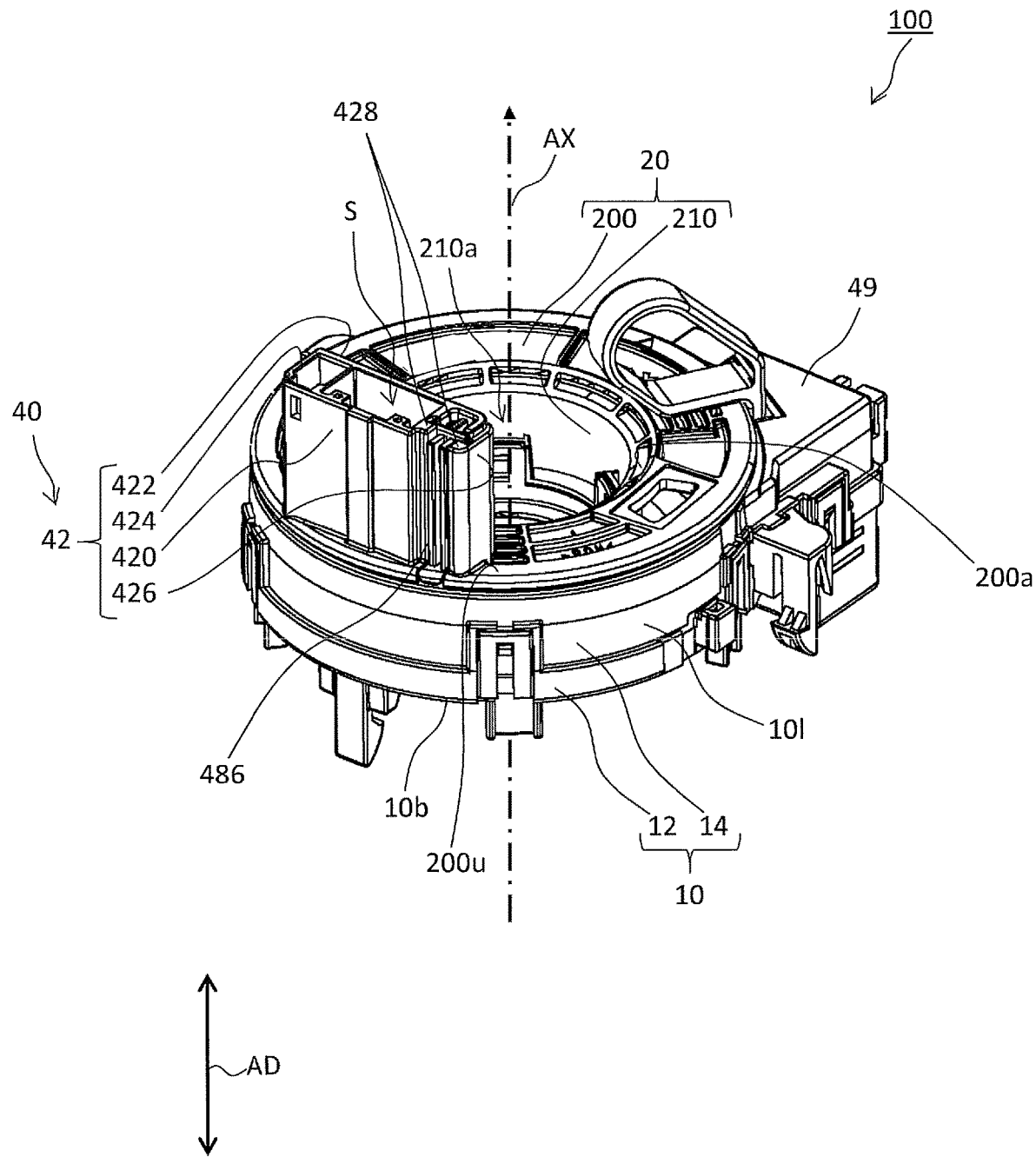
FIG. 1 is a perspective view of a rotary connector device according to an embodiment.
Figure 2:
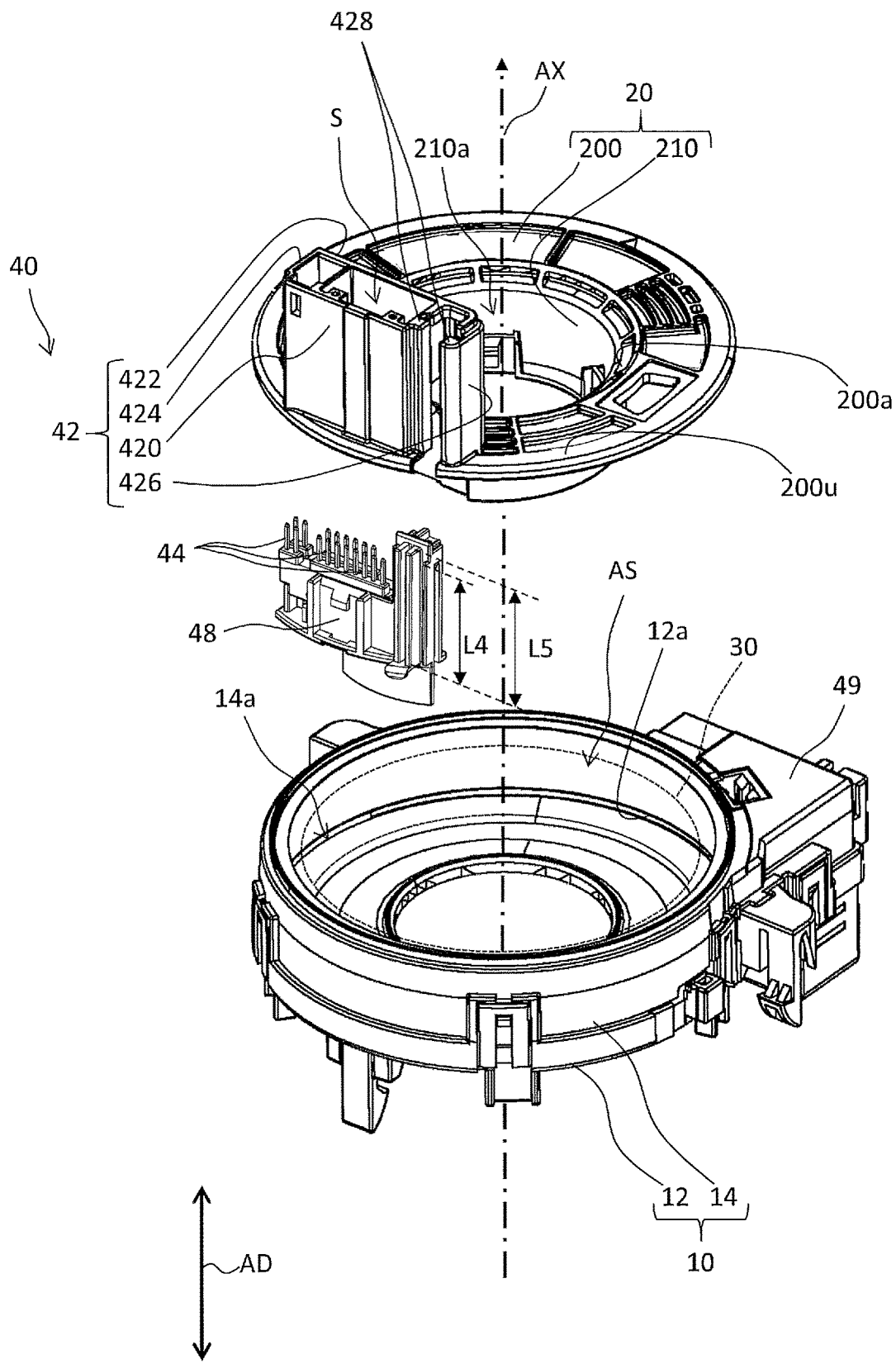
FIG. 2 is an exploded perspective view in which a rotation body is removed from a fixed body and a holding member is removed from a connector.

FIG. 1 is a perspective view of a rotary connector device 100 according to an embodiment. FIG. 2 is an exploded perspective view in which a rotation body 20 is removed from a fixed body 10 and a holding member 48 is removed from a connector 40.

As illustrated in FIGS. 1 and 2, the rotary connector device 100 includes the fixed body 10 and the rotation body 20. The rotation body 20 is assembled to the fixed body 10 so as to be rotatable about a rotation axis AX with respect to the fixed body 10. In a state where the rotation body 20 is assembled to the fixed body 10, a housing space AS is defined between the fixed body 10 and the rotation body 20.

As illustrated by the dotted line in FIG. 2, a cable conducting wire 30 is disposed in the housing space AS. The cable conducting wire 30 is connected between the fixed body 10 and the rotation body 20. The cable conducting wire 30 forms a transmission path between the fixed body 10 and the rotation body 20.

The rotary connector device 100 is used, for example, in a moving body (e.g., an automobile) including a main body and a steering portion that is rotatable with respect to the main body. Specifically, the fixed body 10 is attached to the main body of the moving body. The rotation body 20 is attached to the steering portion. One end of the cable conducting wire 30 is electrically connected to an electrical device (e.g., a switch) provided in the steering portion. The other end of the cable conducting wire 30 is electrically connected to an electrical device provided in the main body of the moving body. Thus, the rotary connector device 100 transmits and receives electric power or electrical signals between the electrical device provided in the main body of the moving body and the electrical device provided in the steering portion. However, the rotary connector device 100 may be used for something other than a moving body.

Configuration of Fixed Body

As illustrated in FIGS. 1 and 2, the fixed body 10 includes a first fixed body portion 12 and a second fixed body portion 14. The second fixed body portion 14 is coupled to the first fixed body portion 12 in a state of being disposed on the first fixed body portion 12. The first fixed body portion 12 constitutes a bottom portion 10b of the fixed body 10. The second fixed body portion 14 constitutes a side wall 101 of the fixed body 10.

As illustrated in FIG. 2, the first fixed body portion 12 has a ring shape when the rotary connector device 100 is viewed in an axial direction AD substantially parallel to the rotation axis AX. The first fixed body portion 12 is disposed such that the rotation axis AX passes through the center of the first fixed body portion 12. The second fixed body portion 14 has a cylindrical shape in which a hollow portion 14a of the second fixed body portion 14 extends in the axial direction AD. The second fixed body portion 14 extends upward from an outer periphery 12a of the first fixed body portion 12 in the axial direction AD.

Configuration of Rotation Body

The rotation body 20 includes an annular member 200 and an inner-circumferential cylindrical portion 210. The annular member 200 has a ring shape when the rotary connector device 100 is viewed in the axial direction AD. The annular member 200 includes an opening 202 (see FIG. 4) through which the cable conducting wire 30 passes. The annular member 200 is disposed such that the rotation axis AX passes through the center of the annular member 200. The inner-circumferential cylindrical portion 210 is disposed such that a hollow portion 210a of the inner-circumferential cylindrical portion 210 extends in the axial direction AD. The inner-circumferential cylindrical portion 210 extends downward along the axial direction AD from an inner periphery 200a of the annular member 200. The inner-circumferential cylindrical portion 210 is disposed inward of the cylindrical second fixed body portion 14 in the radial direction of the rotation axis AX. Thus, the housing space AS in which the cable conducting wire 30 is disposed is defined by the first fixed body portion 12, the second fixed body portion 14, the annular member 200, and the inner-circumferential cylindrical portion 210. In other words, the housing space AS in which the cable conducting wire 30 is disposed is equal to a space obtained by excluding the hollow portion 210a of the inner-circumferential cylindrical portion 210 from the hollow portion 14a of the second fixed body portion 14.

In the present embodiment, the inner-circumferential cylindrical portion 210 is provided in the rotation body 20. However, in order to define the housing space AS, the inner-circumferential cylindrical portion 210 may be provided in the fixed body 10. Further, in the present embodiment, the rotary connector device 100 has a shape including the hollow portion 210a, but the rotary connector device 100 may not include the hollow portion 210a.

Configuration of Connector

As illustrated in FIG. 1, the rotary connector device 100 includes the connector 40 on the rotation body 20 side and a connector 49 on the fixed body 10 side.

The connector 40 is connected to the rotation body 20. The connector 40 includes a cover 42 and a terminal 44. The cover 42 extends upward from the annular member 200 in the axial direction AD. The cover 42 includes a space S therein. The space S is open upward in the axial direction AD. The opening 202 (see FIG. 4) of the annular member 200 opens the space S downward in the axial direction AD. The terminal 44 is disposed in the space S. That is, the terminal 44 is covered with the cover 42. The terminal 44 is electrically connected to one end 30a of the cable conducting wire 30 via a conductor 46 (see FIG. 3) described later. In the present embodiment, the terminal 44 includes a plurality of pins, but the configuration of the terminal 44 is not limited thereto.

More specifically, the cover 42 includes a first wall 420, a second wall 422, a third wall 424, and a fourth wall 426. The first wall 420 and the second wall 422 are spaced apart from each other in the radial direction of the rotation axis AX. In the present embodiment, the first wall 420 and the second wall 422 are spaced apart from each other in a direction D1. The first wall 420 is provided outside the second wall 422 in the radial direction of the rotation axis AX. The first wall 420 and the second wall 422 extend in a direction D2 orthogonal to the direction D1 (an example of a radial direction of the rotation axis AX). The third wall 424 and the fourth wall 426 connect the first wall 420 and the second wall 422. The third wall 424 and the fourth wall 426 extend along the direction D1 in which the first wall 420 and the second wall 422 are spaced apart from each other. However, the configuration of the cover 42 is not limited thereto. The cover 42 need only include at least the first wall 420 including the space S therein and extending upward from the annular member 200 along the axial direction AD.

As illustrated in FIG. 1, the connector 49 on the fixed body 10 side is connected to the fixed body 10. In the present embodiment, the connector 49 is disposed outward of the fixed body 10 in the radial direction of the rotation axis AX, but the connector 49 may be disposed below the fixed body 10 in the axial direction AD. The connector 49 includes a terminal electrically connected to the other end of the cable conducting wire 30.

Configuration of Holding Member

Figure 3:
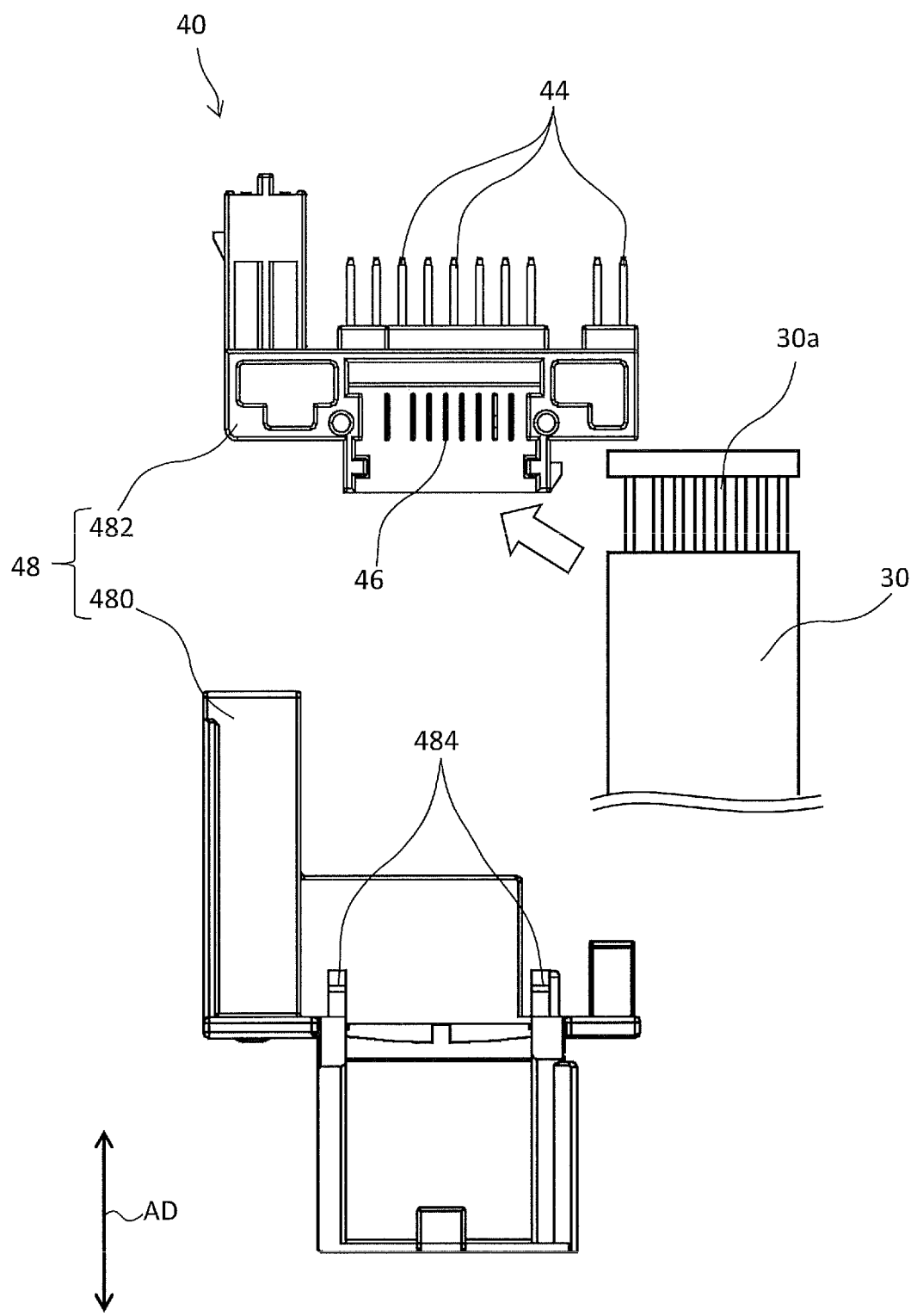
FIG. 3 is a side view, of the holding member, for illustrating connection of a conductive cable.

FIG. 3 is a side view, of the holding member 48, for illustrating connection of the cable conducting wire 30. However, FIG. 3 illustrates the side surface of the holding member 48 with a holding portion 482 removed from a main body portion 480.

The connector 40 includes the conductor 46 for electrical connection between the one end 30a of the cable conducting wire 30 and the terminal 44. The conductor 46 is electrically connected to the terminal 44. In the present embodiment, the conductor 46 includes a plurality of bus bars, but the conductor 46 is not limited thereto.

The connector 40 includes the holding member 48 for holding the conductor 46. The holding member 48 includes the main body portion 480 and the holding portion 482. The main body portion 480 and the holding portion 482 are detachable. The holding portion 482 holds the terminal 44 and the conductor 46. The terminal 44 extends from the holding portion 482 in the axial direction AD. The conductor 46 is exposed from the holding portion 482 in a direction substantially orthogonal to the axial direction AD. As illustrated in FIG. 3, the conductor 46 is connected to the one end 30a of the cable conducting wire 30 in a state where the holding portion 482 is detached from the main body portion 480. The holding portion 482 is attached to the main body portion 480 in a state where the one end 30a of the cable conducting wire 30 is connected.

The main body portion 480 is attached to the connector 40 in the space S with the holding portion 482 attached. Thus, the conductor 46 is disposed in the space S.

Figure 4:
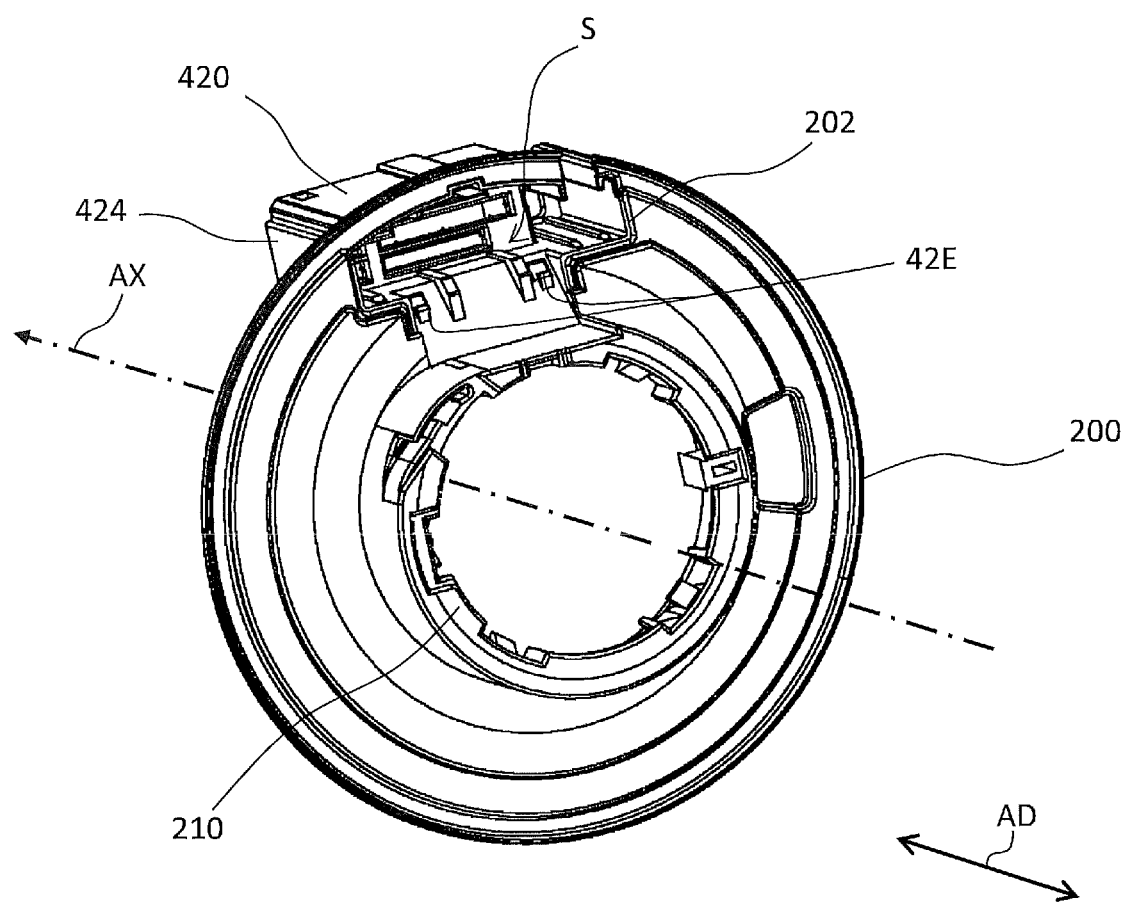
FIG. 4 is a perspective view, of the rotation body, for illustrating attachment of the holding member.

More specifically, the main body portion 480 of the holding member 48 includes a fitting portion 484. As illustrated in FIG. 4, the cover 42 includes a fitted portion 42E provided in the space S. The holding member 48 is attached to the cover 42 in the space S by fitting the fitting portion 484 into the fitted portion 42E along the axial direction AD. However, the attachment of the holding member 48 to the cover 42 is not limited to this structure.

The main body portion 480 includes an exposed portion 486 that is exposed to the outside of the space S in a state where the holding member 48 is attached to the cover 42. As illustrated in FIG. 1, the exposed portion 486 extends, in the first wall 420, upward from the annular member 200 along the axial direction AD.

Restriction Structure

Figure 5:
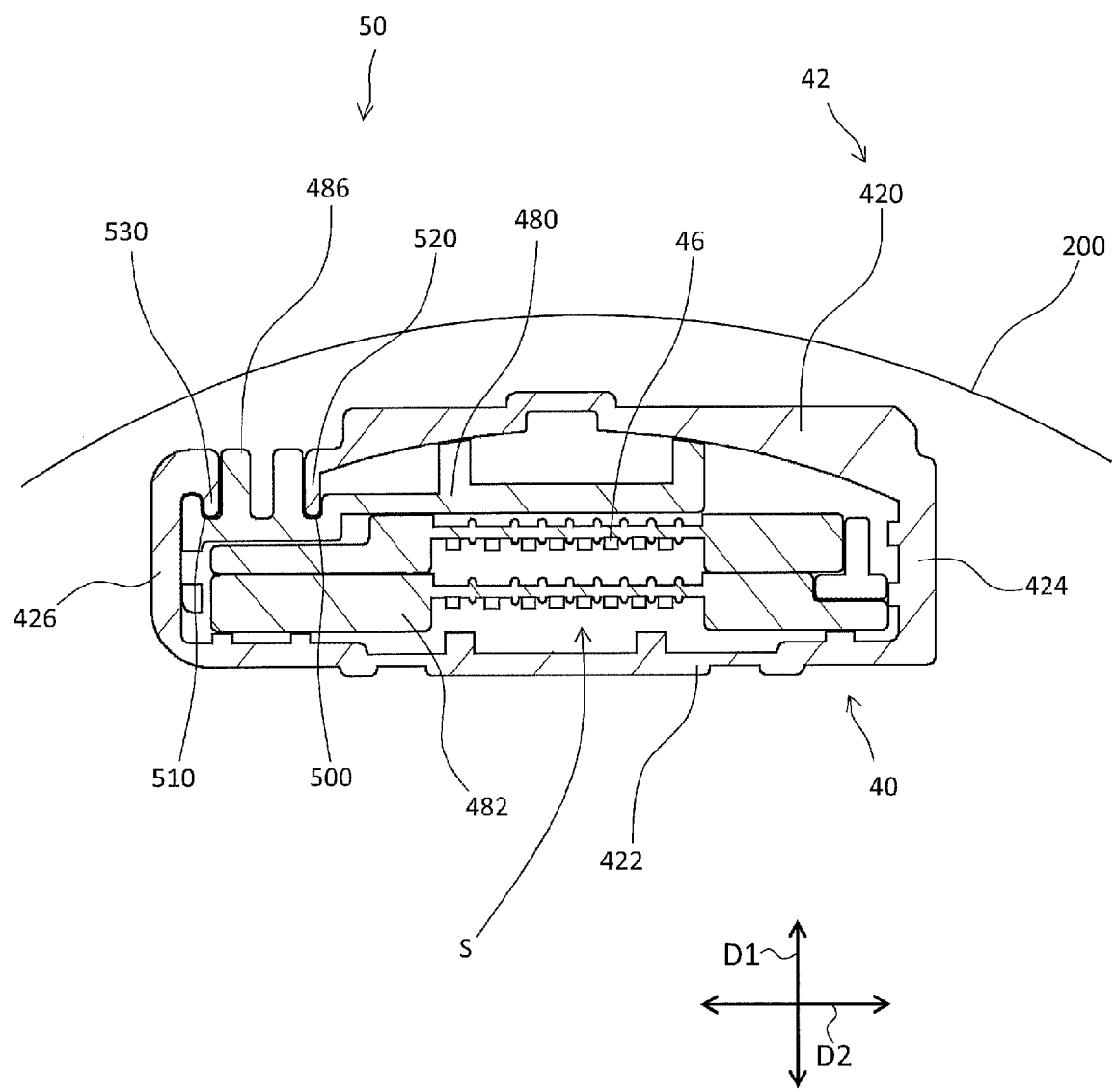
FIG. 5 is a cross-sectional view, of a connector, for illustrating a restriction structure.
Figure 6:
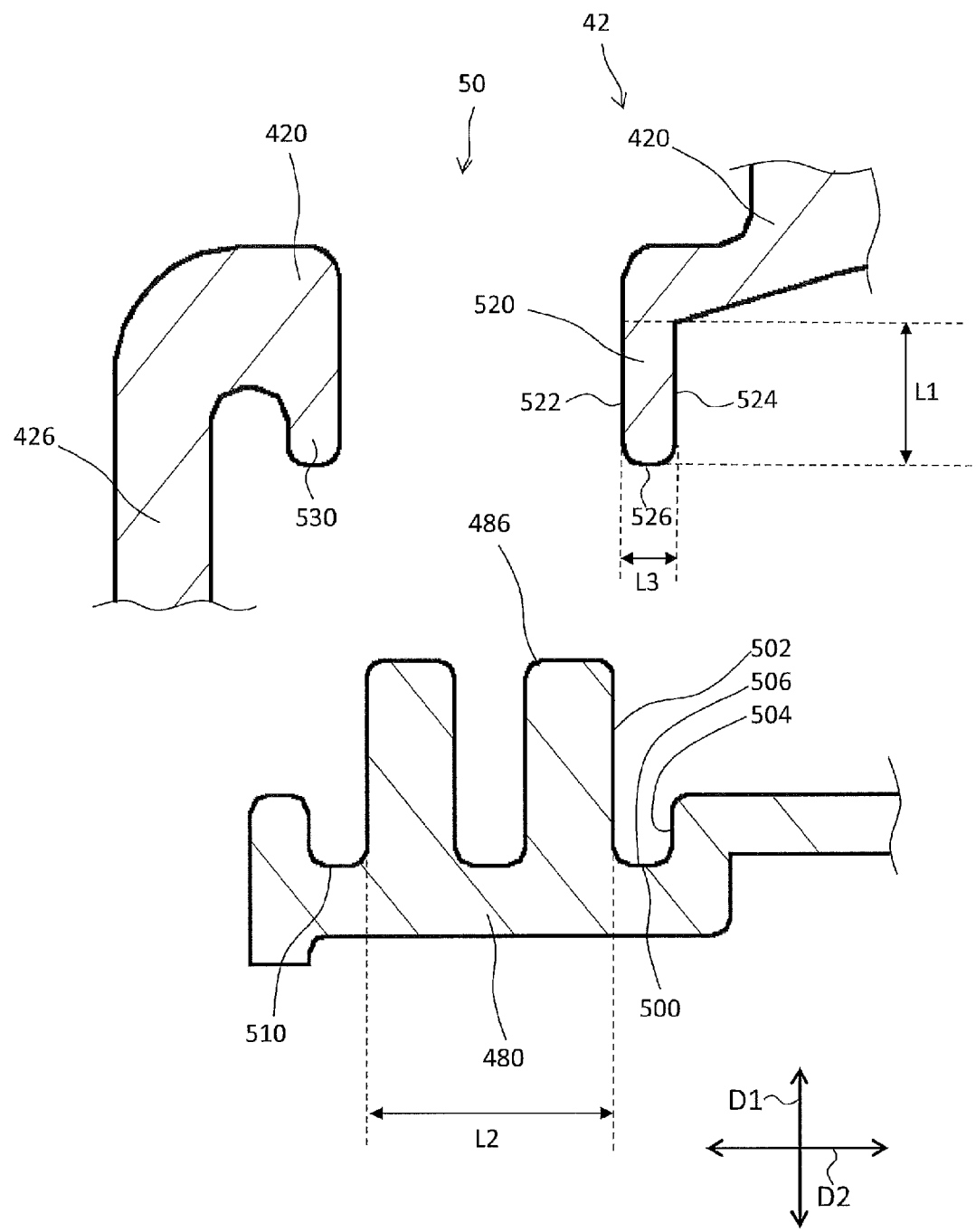
FIG. 6 is an enlarged cross-sectional view, of a connector, for illustrating a restriction structure.

FIG. 5 is a cross-sectional view, of the connector 40, for describing a restriction structure 50. However, the cross-sectional view of FIG. 5 is a cross-sectional view of the connector 40 taken along a plane orthogonal to the axial direction AD. FIG. 6 is an enlarged view of the cross-sectional view of FIG. 5. However, FIG. 6 illustrates a state in which the cover 42 and the holding member 48 are separated from each other to facilitate description.

The cover 42 and the holding member 48 include the restriction structure 50 that restricts foreign matter from entering the space S through the exposed portion 486. As illustrated in FIG. 5, the restriction structure 50 includes a first recess 500, a second recess 510, a first protrusion 520, and a second protrusion 530. In the present embodiment, the main body portion 480 of the holding member 48 includes the first recess 500 and the second recess 510, and the cover 42 includes the first protrusion 520 and the second protrusion 530.

The first protrusion 520 and the second protrusion 530 protrude from the first wall 420 toward the space S along the direction D1 orthogonal to the first wall 420. The first protrusion 520 and the second protrusion 530 are provided sandwiching the exposed portion 486 in the direction D2 orthogonal to the direction D1 along the first wall 420. The first recess 500 and the second recess 510 are recessed toward the space S along the direction D1. The first protrusion 520 is fitted in the first recess 500. The second protrusion 530 is fitted in the second recess 510. Thus, the intrusion path from the exposed portion 486 to the space S has a labyrinth structure. That is, the entry path from the exposed portion 486 to the space S is longer in the direction D1 than in a case where the restriction structure 50 is not provided.

As illustrated in FIG. 6, a length L1 of the first protrusion 520 in the direction D1 is greater than ⅕ of a length L2 of the exposed portion 486 in the direction D2. In addition, the length L1 is greater than a length L3 of the first protrusion 520 in the direction D2. In the present embodiment, the length L1 is greater than ½ of the length L2 and twice or more of the length L3. As the length L1 increases, the intrusion path becomes longer, and thus the effect of restricting the intrusion of foreign matter is enhanced. Further, as the length L1 increases, the fitting strength between the cover 42 and the holding member 48 increases, so that distortion is less likely to occur. Therefore, as the length L1 increases, distortion is further restricted, and foreign matter is restricted from entering the exposed portion 486.

The first recess 500, the second recess 510, the first protrusion 520, and the second protrusion 530 extend upward from the annular member 200 along the axial direction AD. In the present embodiment, a length L4 (see FIG. 2) of the first protrusion 520 in the axial direction AD is greater than ½ of a length L5 of the exposed portion 486 in the axial direction AD. In the present embodiment, the length L4 is substantially the same as the length L5. As a result, the effect of restricting the intrusion of foreign matter is enhanced. Furthermore, because the length L4 is long, the fitting strength between the cover 42 and the holding member 48 is also increased.

However, as illustrated in FIG. 1, the respective upper ends of the first recess 500, the second recess 510, the first protrusion 520, and the second protrusion 530 in the axial direction AD do not reach the upper end of the first wall 420 in the axial direction AD. The respective upper ends of the first recess 500, the second recess 510, the first protrusion 520, and the second protrusion 530 in the axial direction AD are covered by an upper end portion 428 of the cover 42. Thus, the gap between the first recess 500 and the first protrusion 520, and the gap between the second recess 510 and the second protrusion 530 are not exposed from the upper end portion 428. Therefore, foreign matter does not enter the space S through these gaps.

The first recess 500 includes a first surface 502, a second surface 504, and a third surface 506. The first surface 502 and the second surface 504 extend in the direction D1. The third surface 506 is parallel to the axial direction AD and connects the first surface 502 and the second surface 504. The first protrusion 520 includes a fourth surface 522, a fifth surface 524, and a sixth surface 526. The fourth surface 522 and the fifth surface 524 extend in the direction D1. The sixth surface 526 is parallel to the axial direction AD and connects the fourth surface 522 and the fifth surface 524. The first surface 502 is in contact with the fourth surface 522. The second surface 504 is in contact with the fifth surface 524. The third surface 506 is in contact with the sixth surface 526. As a result, the intrusion path from the exposed portion 486 to the space S becomes narrower than in the case where the restriction structure 50 is not provided.

First Modified Example

Figure 7:
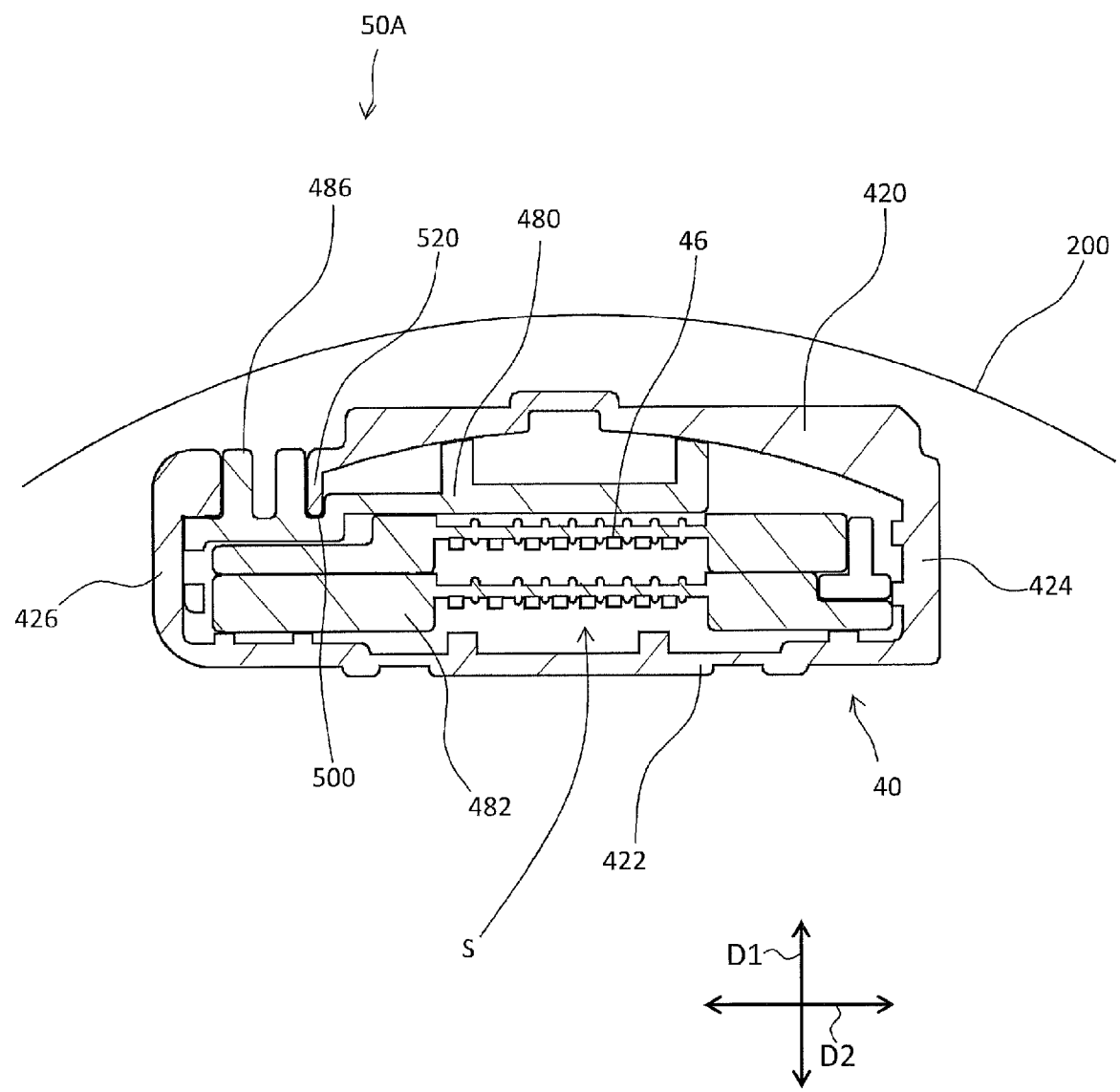
FIG. 7 is a cross-sectional view for illustrating a restriction structure according to a first modified example of the restriction structure.

Next, a restriction structure 50A according to a first modified example of the restriction structure 50 will be described with reference to FIG. 7. FIG. 7 is a cross-sectional view of the connector 40. As illustrated in FIG. 7, the restriction structure 50A differs from the restriction structure 50 in that the restriction structure 50A does not include the second recess 510 and the second protrusion 530.

However, unlike the restriction structure 50A, the restriction structure may not include the first recess 500 and the first protrusion 520 and may include the second recess 510 and the second protrusion 530. In addition, the restriction structure may include an additional recess and an additional protrusion adjacent to the first recess 500 and the first protrusion 520 in the direction D2, respectively. The greater the number of recesses and protrusions, the longer the intrusion path in the direction D1.

Second Modified Example

Figure 8:
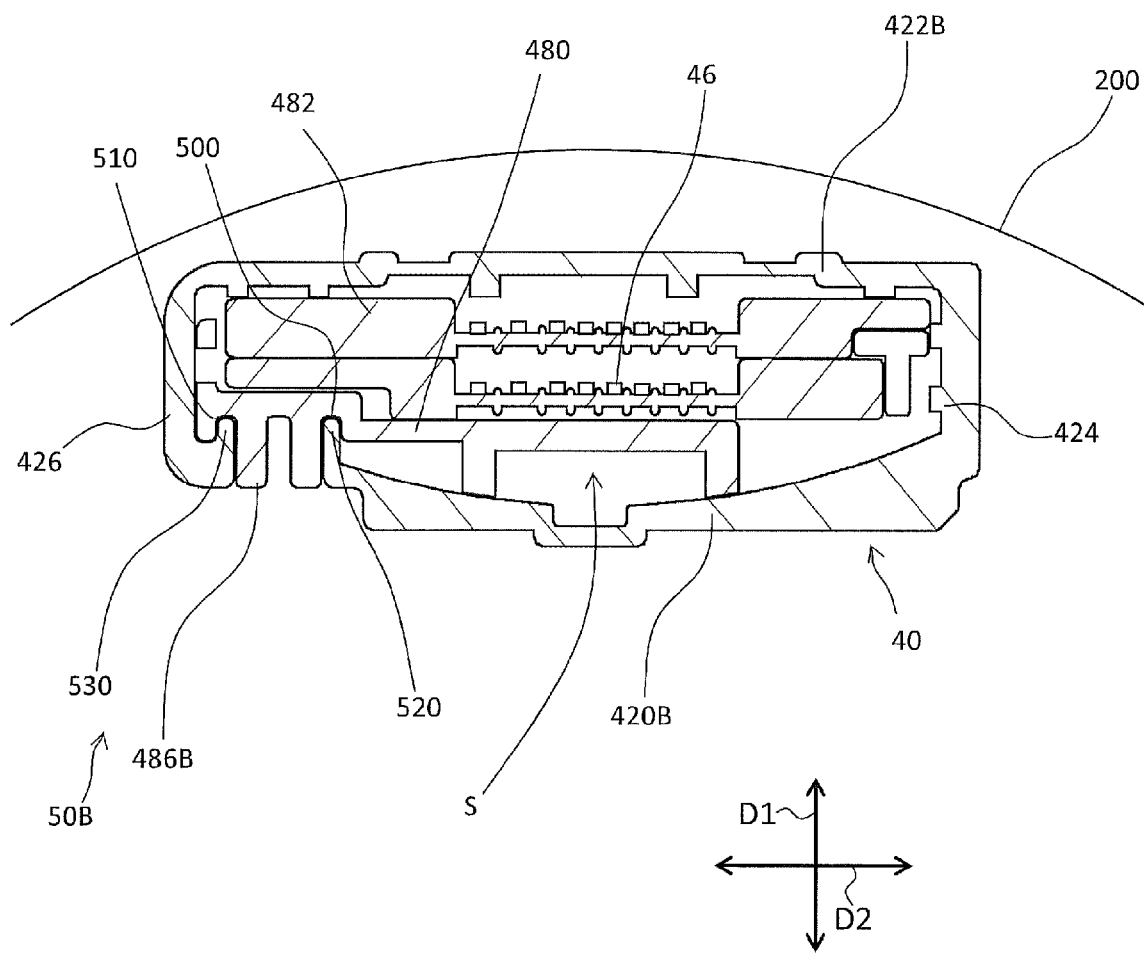
FIG. 8 is a cross-sectional view for illustrating a restriction structure according to a second modified example of the restriction structure.

Next, a restriction structure 50B according to a second modified example of the restriction structure 50 will be described with reference to FIG. 8. FIG. 8 is a cross-sectional view of the connector 40. As illustrated in FIG. 8, the restriction structure 50B differs from the restriction structure 50 in that a first wall 420B is provided inward of a second wall 422B in the radial direction of the rotation axis AX. Therefore, an exposed portion 486B is provided inward of the second wall 422B in the radial direction of the rotation axis AX.

The first wall is not limited to the configurations of the above-described embodiments and the first to third modified examples. For example, the first wall may extend in the radial direction of the rotation axis AX. That is, the exposed portion and the restriction structure may be provided on a first wall that extends in the radial direction of the rotation axis AX.

Third Modified Example

Figure 9:
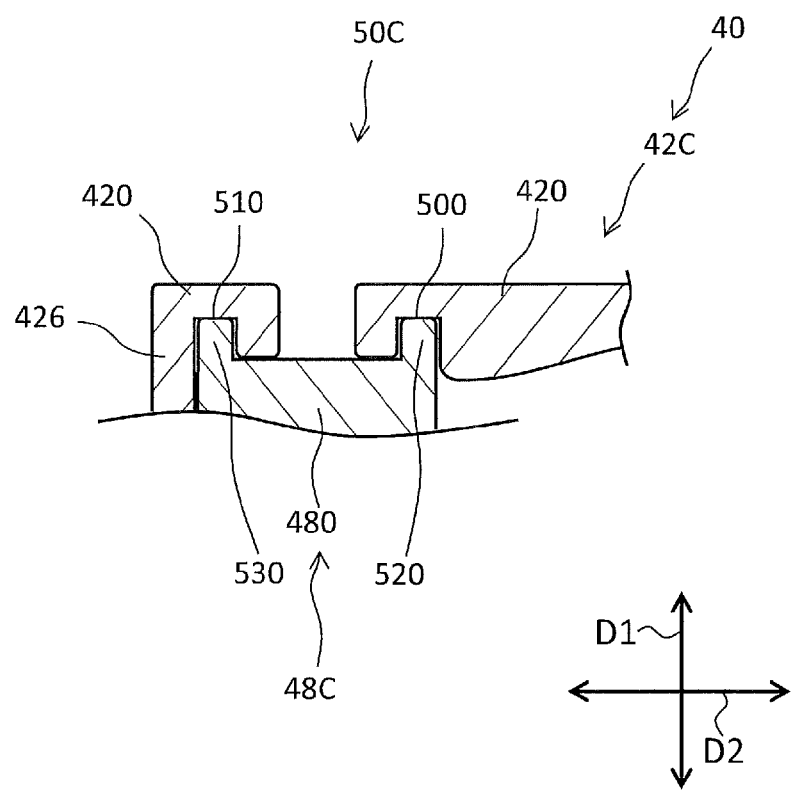
FIG. 9 is a cross-sectional view for illustrating a restriction structure according to a third modified example of the restriction structure.

Next, a restriction structure 50C according to a third modified example will be described with reference to FIG. 9. FIG. 9 is a cross-sectional view of the connector 40. As illustrated in FIG. 9, the restriction structure 50C differs from the restriction structure 50 in that the restriction structure 50C includes a cover 42C including the first recess 500 and the second recess 510, and a holding member 48C including the first protrusion 520 and the second protrusion 530. That is, one of the first recess and the first protrusion may be provided in the cover, and the other of the first recess and the first protrusion may be provided in the holding member. Similarly, one of the second recess and the second protrusion may be provided in the cover, and the other of the second recess and the second protrusion may be provided in the holding member.

Features of Embodiments and Modified Examples

The configuration of the rotary connector device 100 and the features of the rotary connector device 100 are summarized below.

The rotary connector device 100 includes the fixed body 10, the rotation body 20 assembled to the fixed body 10 so as to be rotatable about the rotation axis AX with respect to the fixed body 10, and the connector 40 connected to the rotation body 20. The connector 40 includes the cover 42 that includes the first wall 420 extending from the rotation body 20 in the axial direction AD substantially parallel to the rotation axis AX and formed with the space S therein, the conductor 46 electrically connected to the cable conducting wire 30 and disposed in the space S, and the holding member 48 attached to the cover 42 in the space S and holding the conductor 46. The holding member 48 includes, in the first wall 420, an exposed portion 486 exposed to the outside of the space S. The cover 42 and the holding member 48 include any of restriction structures 50, 50A, 50B, and 50C that restricts foreign matter from entering the space S through the exposed portion 486. Each of the restriction structures 50, 50A, 50B, and 50C includes the first protrusion 520 protruding in the direction D1 substantially orthogonal to the first wall 420, and a first recess 500 in which the first protrusion 520 is fitted.

The holding member 48 may include the first recess 500, and the cover 42 may include the first protrusion 520.

According to this configuration, the intrusion path from the exposed portion 486 to the space S is long in the direction D1. Therefore, in this configuration, foreign matter is restricted from entering the space S. The foreign matter is, for example, fluid such as water or powder such as dust.

In addition, the holding member 48 may include the second recess 510 recessed in the direction D1 substantially orthogonal to the first wall 420, the first recess 500 and the second recess 510 are provided sandwiching the exposed portion 486 in the direction D2 substantially orthogonal to the axial direction AD along the first wall 420, and the cover 42 may include the second protrusion 530 fitted in the second recess 510.

In this configuration, because each of the restriction structures 50, 50B, and 50C is provided sandwiching the exposed portion 486, intrusion of foreign matter into the space S is effectively restricted.

The first recess 500 and the first protrusion 520 may extend from the rotation body 20 in the axial direction AD.

In this configuration, each of the restriction structures 50, 50A, 50B, and 50C including the first recess 500 and the first protrusion 520 are in contact with the rotation body 20. Therefore, even when foreign matter accumulates on the surface (an upper surface 200u) of the rotation body 20, the foreign matter is restricted from entering the space S through the exposed portion 486.

The second recess 510 and the second protrusion 530 may extend from the rotation body 20 in the axial direction AD.

In this configuration, each of the restriction structures 50, 50B, and 50C including the second recess 510 and the second protrusion 530 are in contact with the rotation body 20. Therefore, even when foreign matter accumulates on the surface (upper surface 200u) of the rotation body 20, the foreign matter is restricted from entering the space S through the exposed portion 486.

In addition, the cover 42 may include the second wall 422B, the first wall 420B and the second wall 422B may be disposed at a distance from each other in the radial direction of the rotation axis AX, and the first wall 420B may be provided inward of the second wall 422B in the radial direction.

In this configuration, foreign matter arriving from the outside in the radial direction of the rotation axis AX is less likely to reach the first wall 420B where the exposed portion 486B exists. Therefore, in this configuration, foreign matter is restricted from entering the space S through the exposed portion 486B.

Additionally, the first recess 500 may include the first surface 502 extending in the direction D1 substantially orthogonal to the first wall 420, the second surface 504 extending in the direction D1 substantially orthogonal to the first wall 420, and the third surface 506 substantially parallel to the axial direction AD and connecting the first surface 502 and the second surface 504. The first protrusion 520 may include the fourth surface 522 extending in the direction D1 substantially orthogonal to the first wall 420, the fifth surface 524 extending in the direction D1 substantially orthogonal to the first wall 420, and the sixth surface 526 substantially parallel to the axial direction AD and connecting the fourth surface 522 and the fifth surface 524. The first surface 502 may be in contact with the fourth surface 522, the second surface 504 may be in contact with the fifth surface 524, and the third surface 506 may be in contact with the sixth surface 526.

In this configuration, because the first protrusion 520 and the first recess 500 are in surface contact with each other, the intrusion path from the exposed portion 486 to the space S is narrow. Therefore, this configuration effectively restricts foreign matter from entering the space S.

In addition, the length L1 of the first protrusion 520 in the direction D1 substantially orthogonal to the first wall 420 may be greater than ⅕ of the length L2 of the exposed portion 486 in the direction D2 orthogonal to the axial direction AD along the first wall 420.

In this configuration, because the intrusion path from the exposed portion 486 to the space S is lengthened, intrusion of foreign matter into the space S is effectively restricted.

The rotation body 20 includes the annular member 200 assembled to the fixed body 10 so as to be rotatable about the rotation axis AX with respect to the fixed body 10, and the connector 40 connected to the annular member 200. The connector 40 includes the cover 42 including the first wall 420 extending from the annular member 200 in the axial direction AD substantially parallel to the rotation axis AX and formed with the space S therein, the conductor 46 electrically connected to the cable conducting wire 30 and disposed in the space S, and the holding member 48 attached to the cover 42 in the space S and holding the conductor 46. The holding member 48 includes, in the first wall 420, the exposed portion 486 exposed to the outside of the space S, and the cover 42 and the holding member 48 include any of the restriction structures 50, 50A, 50B, and 50C that restricts foreign matter from entering the space S through the exposed portion 486. Each of the restriction structures 50, 50A, 50B, and 50C includes the first protrusion 520 protruding in the direction D1 substantially orthogonal to the first wall 420, and the first recess 500 in which the first protrusion 520 is fitted.

According to this configuration, the intrusion path from the exposed portion 486 to the space S is long in the direction D1. Therefore, in this configuration, foreign matter is restricted from entering the space S.

It should be noted that in the present application, "comprise" and its derivatives are open-ended terms that describe the presence of elements and do not exclude the presence of other elements not described. This also applies to "have," "include" and derivatives thereof.

In the present application, a number such as "first" or "second" is merely a term for identifying a configuration, and does not have any other meaning (e.g., a particular order, or the like). The presence of, for example, a "first element" does not imply that a "second element" exists, and the presence of a "second element" does not imply that a "first element" exists.

Expressions such as "parallel," "orthogonal," and "identical" in the present disclosure should not be interpreted strictly and include the meanings of "substantially parallel," "substantially orthogonal," and "substantially identical." Further, representations of other arrangements are not to be strictly interpreted.

Various alterations and modifications of the disclosure are apparent from the foregoing disclosure. Accordingly, the disclosure may be implemented in a manner different from the specific disclosure of the present application without departing from the spirit of the disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary connector device comprising:
a fixed body;
a rotation body assembled to the fixed body, the rotation body being rotatable about a rotation axis with respect to the fixed body; and
a connector connected to the rotation body, the connector comprising:
a cover including a first wall and a space therein, the first wall extending from the rotation body in an axial direction substantially parallel to the rotation axis;
a conductor electrically connected to a cable conducting wire and disposed in the space; and
a holding member attached to the cover inserted in the space and holding the conductor, the holding member including, in the first wall, an exposed portion exposed to an outside of the space,
the cover and the holding member including a restriction structure to restrict foreign matter from entering the space through the exposed portion,
the restriction structure comprising:
a first protrusion that protrudes in a direction substantially orthogonal to the first wall; and
a first recess in which the first protrusion is fitted,
the holding member including the first recess,
the cover including the first protrusion,
the holding member including a second recess recessed in a direction substantially orthogonal to the first wall,
the first recess and the second recess being provided to sandwich the exposed portion in a direction substantially orthogonal to the axial direction along the first wall, and
the cover including a second protrusion fitted in the second recess.

2. The rotary connector device according to claim 1, wherein the second recess and the second protrusion extend from the rotation body in the axial direction.

3. The rotary connector device according to claim 1, wherein the cover includes a second wall disposed at a distance from the first wall in a radial direction of the rotation axis, and
the first wall is provided inward of the second wall in the radial direction.

4. The rotary connector device according to claim 1, wherein the first recess includes:
a first surface extending in a direction substantially orthogonal to the first wall;
a second surface extending in a direction substantially orthogonal to the first wall; and
a third surface substantially parallel to the axial direction and connecting the first surface and the second surface, and
the first protrusion includes:
a fourth surface extending in a direction substantially orthogonal to the first wall;
a fifth surface extending in a direction substantially orthogonal to the first wall; and
a sixth surface substantially parallel to the axial direction and connecting the fourth surface and the fifth surface,
the first surface is in contact with the fourth surface,
the second surface is in contact with the fifth surface, and
the third surface is in contact with the sixth surface.

5. The rotary connector device according to claim 1, wherein a length of the first protrusion in a direction substantially orthogonal to the first wall is greater than ⅕ of a length of the exposed portion in a direction orthogonal to the axial direction along the first wall.

6. A rotary connector device comprising:
a fixed body;
a rotation body assembled to the fixed body, the rotation body being rotatable about a rotation axis with respect to the fixed body; and
a connector connected to the rotation body, the connector comprising:

a cover including a first wall and a space therein, the first wall extending from the rotation body in an axial direction substantially parallel to the rotation axis;

a conductor electrically connected to a cable conducting wire and disposed in the space; and a holding member attached to the cover inserted in the space and holding the conductor, the holding member including, in the first wall, an exposed portion exposed to an outside of the space, the cover and the holding member including a restriction structure to restrict foreign matter from entering the space through the exposed portion, the restriction structure comprising:

a first protrusion that protrudes in a direction substantially orthogonal to the first wall; and a first recess in which the first protrusion is fitted, the holding member including the first recess, the cover including the first protrusion, and the first recess and the first protrusion extending from the rotation body in the axial direction.

7. A rotation body of a rotary connector device, comprising:

an annular member to be assembled to a fixed body, the annular member being rotatable about a rotation axis with respect to the fixed body; and a connector connected to the annular member, the connector comprising:

a cover including a first wall and a space therein, the first wall extending from the annular member in an axial direction substantially parallel to the rotation axis;

a conductor electrically connected to a cable conducting wire and disposed in the space; and a holding member that is attached to the cover inserted in the space and holds the conductor, the holding member including, in the first wall, an exposed portion exposed to an outside of the space, the cover and the holding member including a restriction structure to restrict foreign matter from entering the space through the exposed portion, the restriction structure comprising:

a first protrusion that protrudes in a direction substantially orthogonal to the first wall; and a first recess in which the first protrusion is fitted, the holding member including the first recess, the cover including the first protrusion, the holding member including a second recess recessed in a direction substantially orthogonal to the first wall, the first recess and the second recess being provided to sandwich the exposed portion in a direction substantially orthogonal to the axial direction along the first wall, and the cover including a second protrusion fitted in the second recess.

\* \* \* \* \*